(12) United States Patent
General

(10) Patent No.: US 11,024,204 B2
(45) Date of Patent: Jun. 1, 2021

(54) HANDHELD LIGHTED STOP SIGN APPARATUS

(71) Applicant: David General, Camlachie (CA)

(72) Inventor: David General, Camlachie (CA)

(*) Notice: Subject to any disclaimer, the term of this patent is extended or adjusted under 35 U.S.C. 154(b) by 0 days.

(21) Appl. No.: 16/507,609

(22) Filed: Jul. 10, 2019

(65) Prior Publication Data

US 2021/0012690 A1   Jan. 14, 2021

(51) Int. Cl.

| | |
|---|---|
| *G09F 13/18* | (2006.01) |
| *G09F 21/02* | (2006.01) |
| *H04N 5/232* | (2006.01) |
| *H04N 5/225* | (2006.01) |
| *G09F 13/16* | (2006.01) |

(52) U.S. Cl.
CPC .............. *G09F 13/18* (2013.01); *G09F 13/16* (2013.01); *G09F 21/026* (2013.01); *H04N 5/2253* (2013.01); *H04N 5/232* (2013.01)

(58) Field of Classification Search
CPC ..................................................... G09F 21/026
USPC ........................................................... 40/586
See application file for complete search history.

(56) References Cited

U.S. PATENT DOCUMENTS

| | | | |
|---|---|---|---|
| D396,821 S | 8/1998 | Enloe | |
| 6,134,820 A * | 10/2000 | Martinez | G09F 7/08 116/63 P |
| 6,198,410 B1 | 3/2001 | White | |
| 6,749,316 B1 * | 6/2004 | Wong | F21V 33/0064 348/552 |
| 7,233,259 B2 | 6/2007 | Gibson | |
| 7,497,040 B2 | 3/2009 | Chambless | |
| 8,098,172 B2 | 1/2012 | Graham | |
| 9,153,149 B1 | 10/2015 | Curtiss | |
| 2003/0033739 A1 | 2/2003 | Tingle | |
| 2005/0062616 A1 | 3/2005 | Vernon-Dier | |
| 2006/0028811 A1 * | 2/2006 | Ross, Jr. | H04N 5/2252 362/157 |
| 2006/0061487 A1 | 3/2006 | Heap | |
| 2006/0171700 A1 * | 8/2006 | Yang | F21V 33/0052 396/155 |
| 2007/0205917 A1 * | 9/2007 | Nickson | G09F 21/02 340/907 |
| 2008/0110067 A1 * | 5/2008 | Smith | G09F 13/00 40/541 |
| 2010/0052934 A1 * | 3/2010 | Clegg | B42D 15/022 340/815.4 |
| 2015/0009672 A1 * | 1/2015 | Girault | A45F 5/00 362/253 |
| 2015/0121731 A1 * | 5/2015 | Flaming | G09F 7/20 40/541 |

(Continued)

*Primary Examiner* — Gary C Hoge

(57) ABSTRACT

A handheld lighted stop sign apparatus for increased visibility and safety for traffic control includes a sign body having a sign front side, a sign back side, an octagonal sign perimeter, a pair of reflectors having a "STOP" lettering, and a handle. A rim extends from the handle and a plurality of LED lights is coupled within the rim. A battery is coupled within a handle cavity and is in operational communication with the plurality of LED lights. A battery charge port is coupled to the handle. The battery charge port is coupled to the sign body and is in operational communication with the battery. A power switch is coupled to the handle. The power switch is in operational communication with the battery and the plurality of LED lights.

6 Claims, 5 Drawing Sheets

(56) References Cited

U.S. PATENT DOCUMENTS

2018/0103240 A1   4/2018   Barnes

\* cited by examiner

HANDHELD LIGHTED STOP SIGN APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to stop signs and more particularly pertains to a new stop sign for increased visibility and safety for traffic control.

BRIEF SUMMARY OF THE INVENTION

An embodiment of the disclosure meets the needs presented above by generally comprising a sign body having a sign front side, a sign back side, and an octagonal sign perimeter. A pair of reflectors is coupled to the sign front side and the sign back side. Each of the pair of reflectors is octagonal and has a "STOP" lettering. A handle is coupled to the sign body. A handle top end of the handle has a sign slot extending towards a handle bottom end. The sign slot is coupled around a sign bottom edge of the sign body. A sidewall of the handle forms a handle cavity with the handle top end and the handle bottom end. A rim is coupled to the sign body. The rim comprises a rim front half coupled to the sign front side around the sign perimeter and a rim back half coupled to the sign back side around the sign perimeter. The rim extends from a handle left side of the handle adjacent the sign slot to a handle right side of the handle adjacent the sign slot. A plurality of LED lights is coupled within the rim front half and the rim back half. A battery is coupled within the handle cavity and is in operational communication with the plurality of LED lights. A battery charge port is coupled to the handle. The battery charge port is coupled to the handle bottom end and is in operational communication with the battery. A power switch is coupled to the handle. The power switch is in operational communication with the battery and the plurality of LED lights.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
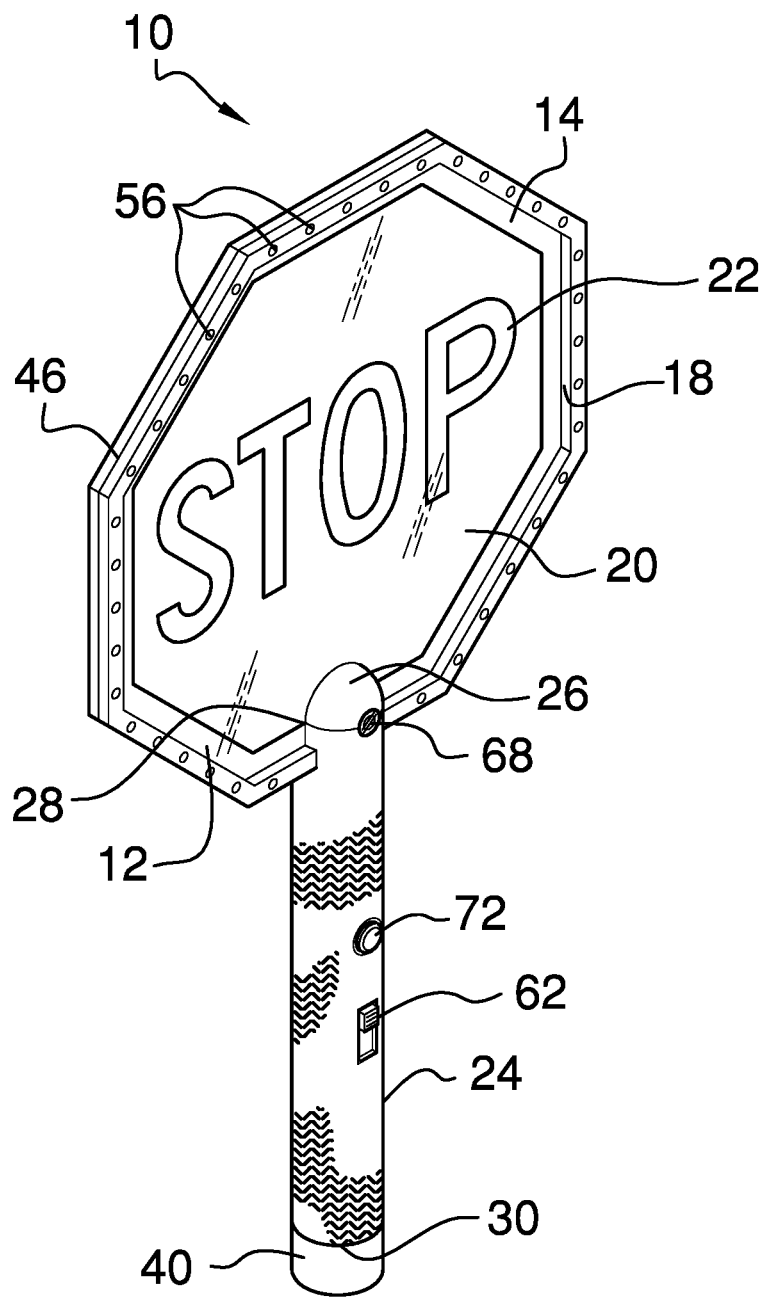
FIG. 1 is an isometric view of a handheld lighted stop sign apparatus according to an embodiment of the disclosure.
Figure 2:
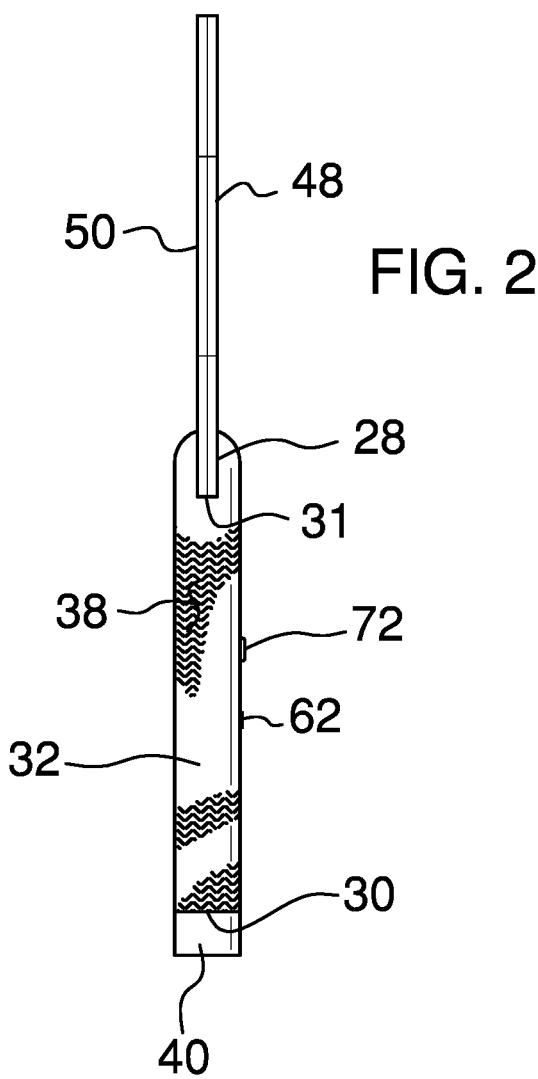
FIG. 2 is a side elevation view of an embodiment of the disclosure.
Figure 3:
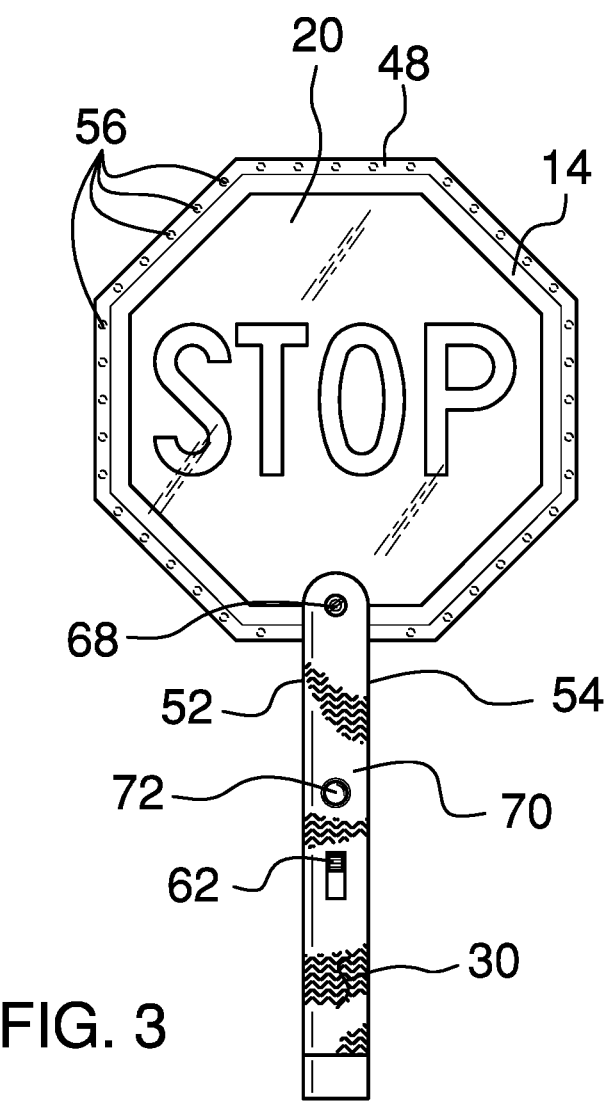
FIG. 3 is a front elevation view of an embodiment of the disclosure.
Figure 4:
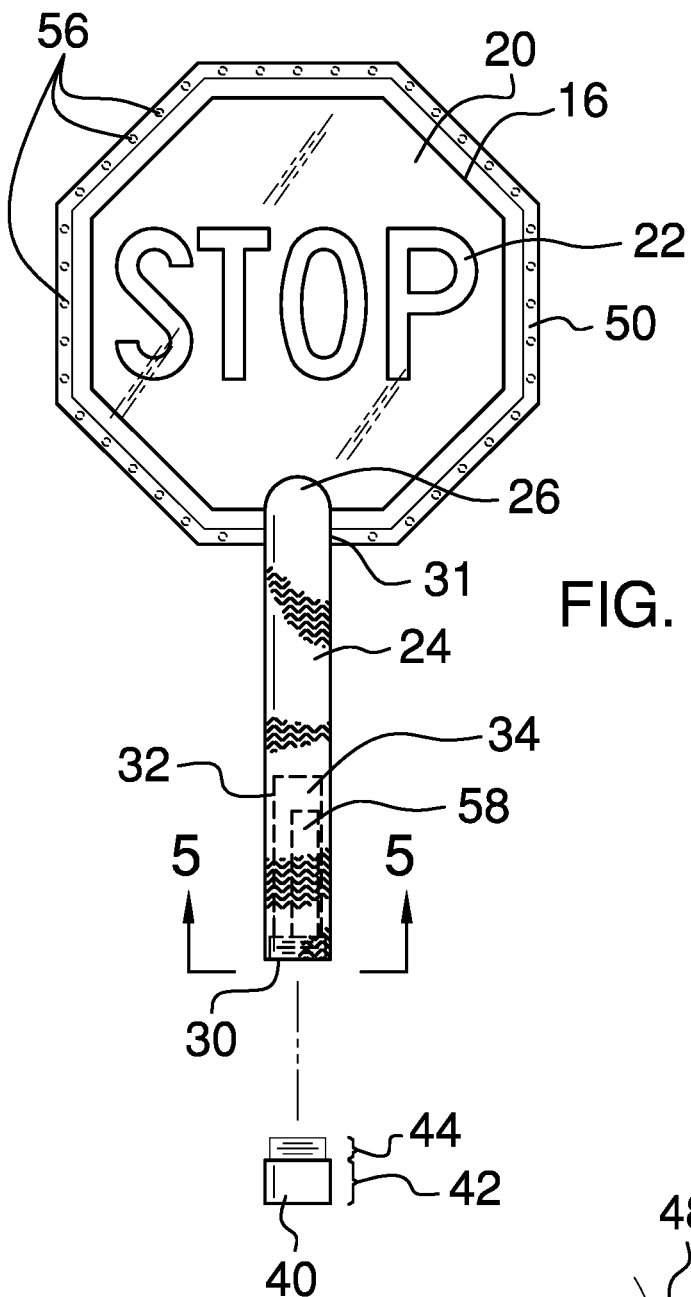
FIG. 4 is a rear elevation view of an embodiment of the disclosure.
Figure 5:
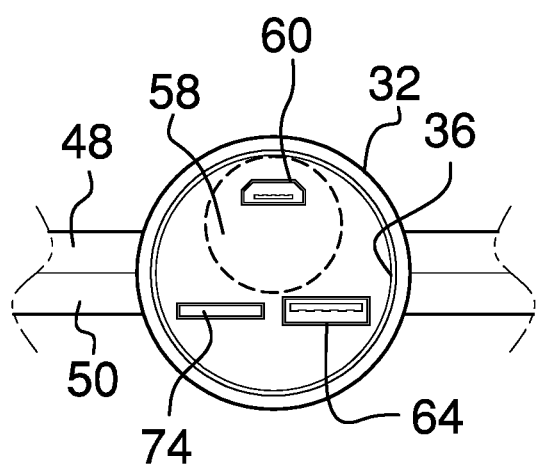
FIG. 5 is a bottom plan view of an embodiment of the disclosure.
Figure 6:
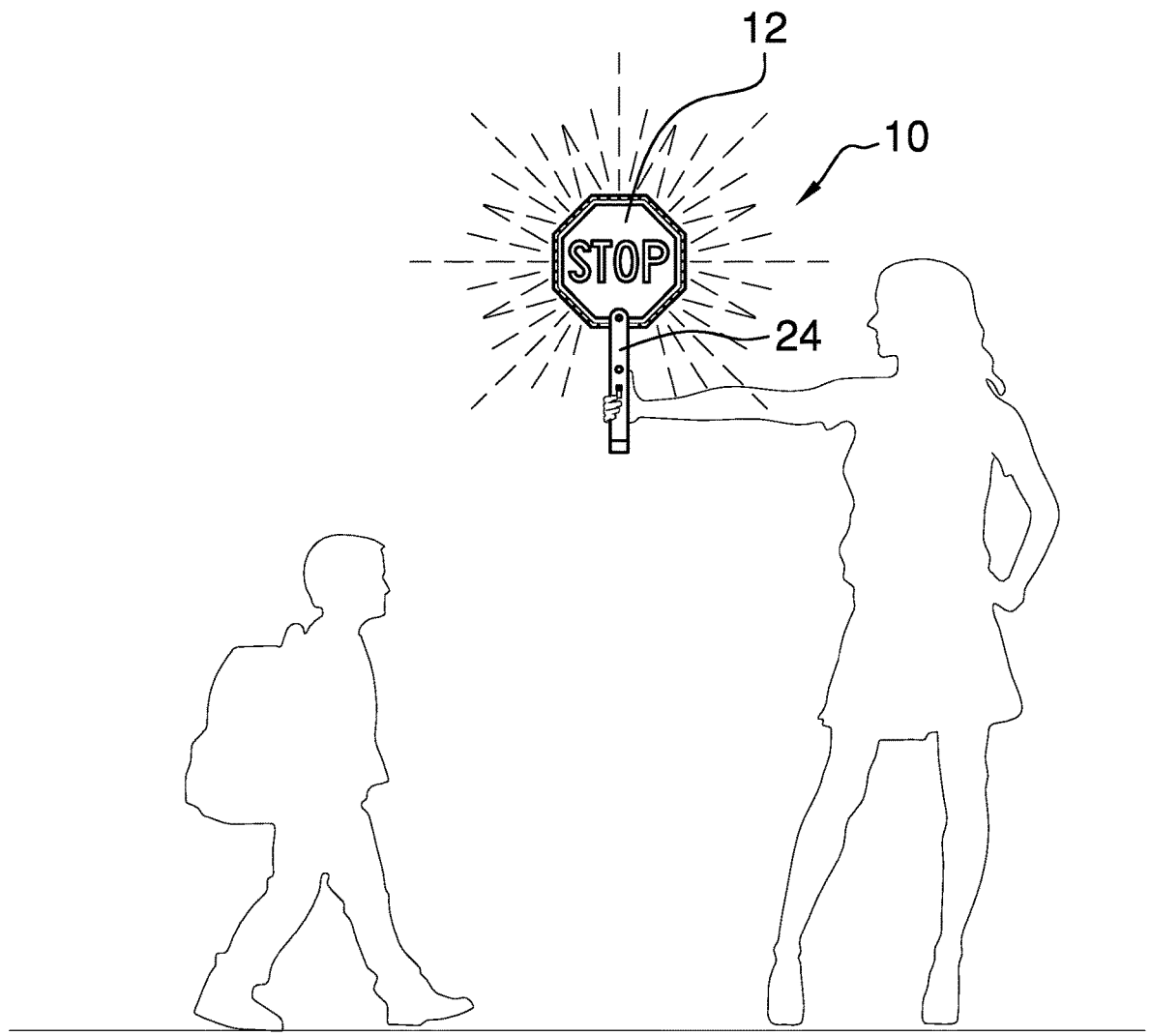
FIG. 6 is an in-use view of an embodiment of the disclosure.
Figure 7:
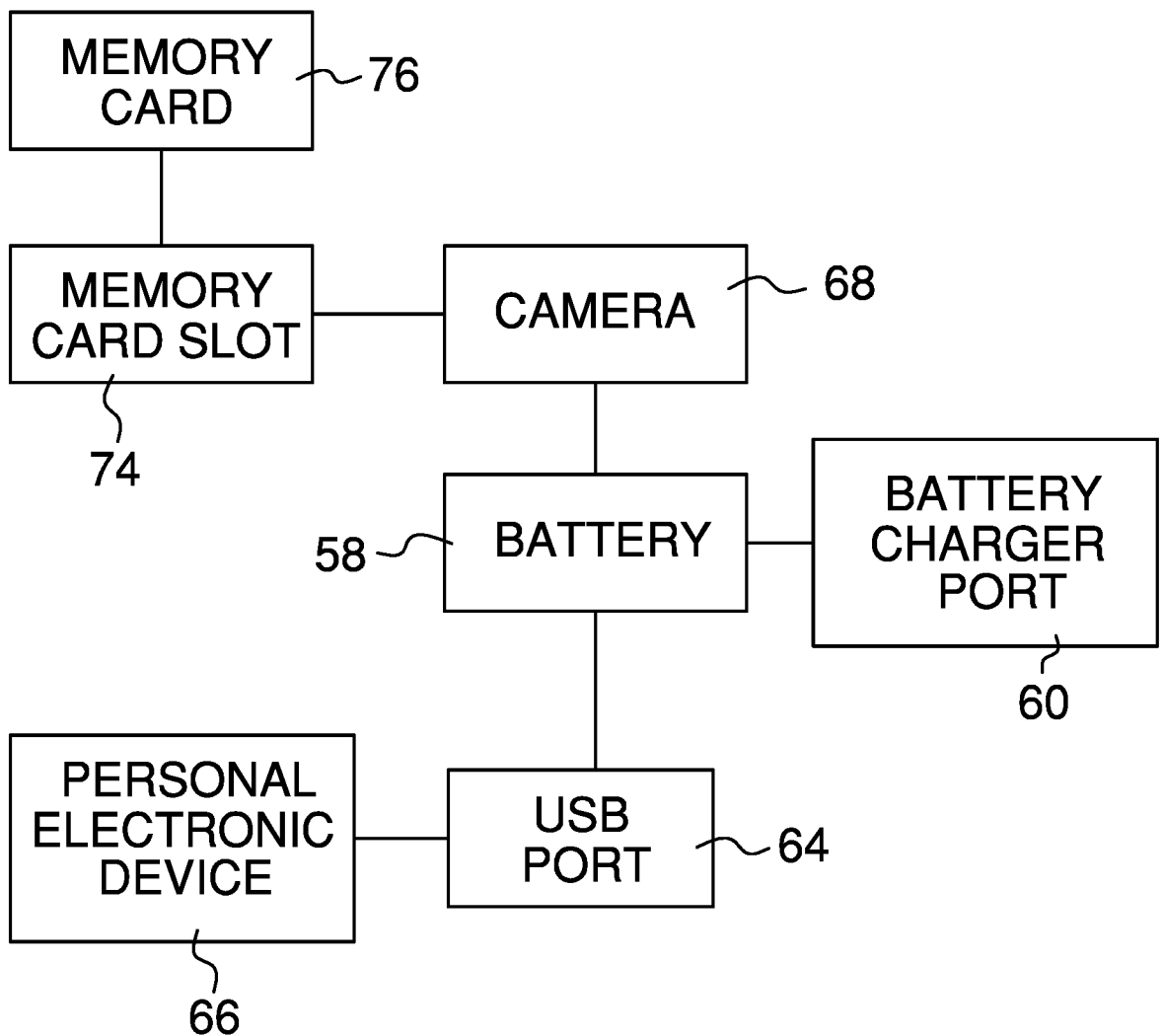
FIG. 7 is a block diagram of an embodiment of the disclosure.

With reference now to the drawings, and in particular to FIGS. 1 through 7 thereof, a new stop sign embodying the principles and concepts of an embodiment of the disclosure and generally designated by the reference numeral 10 will be described.

As best illustrated in FIGS. 1 through 7, the handheld lighted stop sign apparatus 10 generally comprises a sign body 12 having a sign front side 14, a sign back side 16, and an octagonal sign perimeter 18. A pair of reflectors 20 is coupled to the sign body 12. The pair of reflectors 20 is coupled to the sign front side 14 and the sign back side 16. Each of the pair of reflectors 20 is octagonal and has a "STOP" lettering 22. A handle 24 is coupled to the sign body 12. A rounded handle top end 26 of the handle 24 has a sign slot 28 extending towards a handle bottom end 30. The sign slot 28 is coupled around a sign bottom edge 31 of the sign body 12. A sidewall 32 of the handle 24 forms a handle cavity 34 with the handle top end 26 and the handle bottom end 30. The sidewall 32 of the handle 24 extends past the handle bottom end 30. An inner surface 36 of the sidewall 32 is threaded. A non-slip grip 38 may be coupled to the handle 24 and is continuously disposed on the sidewall 32 for user comfort and to prevent accidental slippage. A cap 40 is coupled to the handle 24 and has a base portion 42 and a threaded portion 44. The threaded portion 44 is selectively engageable with the inner surface 36 of the sidewall 32 to cover and alternatively expose the handle bottom end 30.

A rim 46 is coupled to the sign body 12 and comprises a rim front half 48 coupled to the sign front side 14 around the sign perimeter 18 and a rim back half 50 coupled to the sign back side 16 around the sign perimeter 18. The rim 46 extends from a handle left side 52 of the handle 24 adjacent the sign slot 28 to a handle right side 54 of the handle 24 adjacent the sign slot 28. A plurality of LED lights 56 is coupled within the rim front half 48 and the rim back half 50. The plurality of LED lights 56 may be red and blue to attract attention. The plurality of LED lights 56 is evenly distributed along the rim front half 48 and the rim back half 50. A battery 58 is coupled within the handle cavity 34 and is in operational communication with the plurality of LED lights 56. A battery charge port 60 is coupled to the handle 24. The battery charge port 60 is coupled to the handle bottom end 30 and is in operational communication with the battery 58 to receive a charger to charge the battery 58. A power switch 62 is coupled to the handle 24 and is in operational communication with the battery 58 and the plurality of LED lights 56. A USB port 64 is coupled within the handle bottom end 30 and is in operational communication with the battery 58. The USB port 64 is configured to receive and charge a personal electronic device 66. A camera 68 is coupled to a handle front side 70 of the handle 24 proximal the handle top end 26. The camera 68 is in operational communication with the battery 58. A camera trigger 72 is coupled to the handle front side 70 and is in operational communication with the camera 68. A memory card slot 74 is coupled within the handle bottom end 30 and is in operational communication with the camera 68. The memory card slot 74 is configured to receive a memory card 76 to store pictures taken with the camera 68. The cap 40 is engaged to cover and protect the battery charge port 60, the USB port 64, and the memory card slot 74.

In use, the user holds the handle 24 and uses the power switch 62 to activate the plurality of LED lights 56. The user may depress the camera trigger 72 to take pictures with the camera 68 of drivers that commit infractions.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A handheld lighted stop sign apparatus comprising:
   a sign body, the sign body having a sign front side, a sign back side, and an octagonal sign perimeter;
   a pair of reflectors coupled to the sign body, the pair of reflectors being coupled to the sign front side and the sign back side, each of the pair of reflectors being octagonal and having a "STOP" lettering;
   a handle coupled to the sign body, a handle top end of the handle having a sign slot extending towards a handle bottom end, the sign slot being coupled around a sign bottom edge of the sign body, a sidewall of the handle forming a handle cavity with the handle top end and the handle bottom end;
   a rim coupled to the sign body, the rim comprising a rim front half coupled to the sign front side around the sign perimeter and a rim back half coupled to the sign back side around the sign perimeter, the rim extending from a handle left side of the handle adjacent the sign slot to a handle right side of the handle adjacent the sign slot;
   a plurality of LED lights coupled to the rim, the plurality of LEI) lights being coupled within the rim front half and the rim back half;
   a battery coupled to the handle, the battery being coupled within the handle cavity and in operational communication with the plurality of LED lights;
   a battery charge port coupled to the handle, the battery charge port being coupled to the handle bottom end and in operational communication with the battery;
   a power switch coupled to the handle, the power switch being in operational communication with the battery and the plurality of LED lights;
   a camera coupled to the handle, the camera being coupled to a handle front side of the handle proximal the handle top end, the camera being in operational communication with the battery;
   a camera trigger coupled to the handle, the camera trigger being coupled to the handle front side and in operational communication with the camera; and
   a memory card slot coupled to the handle, the memory card slot being coupled within the handle bottom end and in operational communication with the camera, the memory card slot being configured to receive a memory card to store pictures taken with the camera.

2. The handheld lighted stop sign apparatus of claim 1 further comprising the sidewall of the handle extending past the handle bottom end, an inner surface of the sidewall being threaded, a cap having a base portion and a threaded portion, the threaded portion being selectively engageable with the inner surface of the sidewall to cover and alternatively expose the handle bottom end.

3. The handheld lighted stop sign apparatus of claim 1 further comprising the handle top end being rounded.

4. The handheld lighted stop sign apparatus of claim 1 further comprising a USB port coupled to the handle, the USB port being coupled within the handle bottom end and in operational communication with the battery, the USB port being configured to receive and charge a personal electronic device.

5. The handheld lighted stop sign apparatus of claim 1 further comprising a non-slip grip coupled to the handle, the non-slip grip being continuously disposed on the sidewall.

6. A handheld lighted stop sign apparatus comprising:
   a sign body, the sign body having a sign front side, a sign back side, and an octagonal sign perimeter;
   a pair of reflectors coupled to the sign body, the pair of reflectors being coupled to the sign front side and the sign back side, each of the pair of reflectors being octagonal and having a "STOP" lettering;
   a handle coupled to the sign body, a rounded handle top end of the handle having a sign slot extending towards a handle bottom end, the sign slot being coupled around a sign bottom edge of the sign body, a sidewall of the handle forming a handle cavity with the handle top end and the handle bottom end, the sidewall of the handle extending past the handle bottom end, an inner surface of the sidewall being threaded;

a non-slip grip coupled to the handle, the non-slip grip being continuously disposed on the sidewall;

a cap coupled to the handle, the cap having a base portion and a threaded portion, the threaded portion being selectively engageable with the inner surface of the sidewall to cover and alternatively expose the handle bottom end;

a rim coupled to the sign body, the rim comprising a rim front half coupled to the sign front side around the sign perimeter and a rim back half coupled to the sign back side around the sign perimeter, the rim extending from a handle left side of the handle adjacent the sign slot to a handle right side of the handle adjacent the sign slot;

a plurality of LED lights coupled to the rim, the plurality of LED lights being coupled within the rim front half and the rim back half;

a battery coupled to the handle, the battery being coupled within the handle cavity and in operational communication with the plurality of LED lights;

a battery charge port coupled to the handle, the battery charge port being coupled to the handle bottom end and in operational communication with the battery;

a power switch coupled to the handle, the power switch being in operational communication with the battery and the plurality of LED lights;

a USB port coupled to the handle, the USB port being coupled within the handle bottom end and in operational communication with the battery, the USB port being configured to receive and charge a personal electronic device;

a camera coupled to the handle, the camera being coupled to a handle front side of the handle proximal the handle top end, the camera being in operational communication with the battery;

a camera trigger coupled to the handle, the camera trigger being coupled to the handle front side and in operational communication with the camera; and a memory card slot coupled to the handle, the memory card slot being coupled within the handle bottom end and in operational communication with the camera, the memory card slot being configured to receive a memory card to store pictures taken with the camera.

* * * * *